H. B. HARTMAN.
METHOD OF PURIFYING WATER ELECTROLYTICALLY.
APPLICATION FILED MAR. 2, 1908.

943,188.

Patented Dec. 14, 1909.

3 SHEETS—SHEET 1.

WITNESSES.

INVENTOR.

H. B. HARTMAN.
METHOD OF PURIFYING WATER ELECTROLYTICALLY.
APPLICATION FILED MAR. 2, 1908.
943,188.
Patented Dec. 14, 1909.
3 SHEETS—SHEET 2.
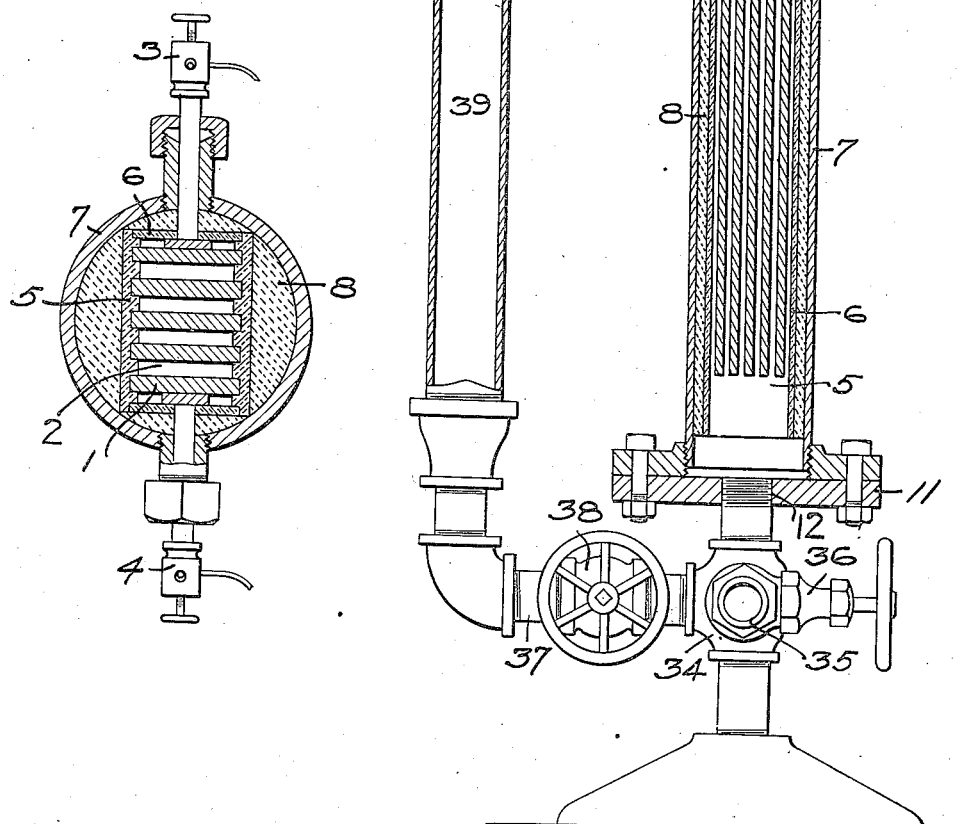
WITNESSES.
INVENTOR H. B. HARTMAN.
METHOD OF PURIFYING WATER ELECTROLYTICALLY.
APPLICATION FILED MAR. 2, 1908.

943,188.

Patented Dec. 14, 1909.

3 SHEETS—SHEET 3.

WITNESSES.

INVENTOR.

UNITED STATES PATENT OFFICE.

HARRY B. HARTMAN, OF PITTSBURG, PENNSYLVANIA, ASSIGNOR TO McDOWELL MANUFACTURING COMPANY, OF PITTSBURG, PENNSYLVANIA, A CORPORATION OF PENNSYLVANIA.

METHOD OF PURIFYING WATER ELECTROLYTICALLY.

943,188. Specification of Letters Patent. Patented Dec. 14, 1909.

Application filed March 2, 1908. Serial No. 418,745.

*To all whom it may concern:*

Be it known that I, HARRY B. HARTMAN, a resident of Pittsburg, in the county of Allegheny and State of Pennsylvania, have invented a new and useful Improvement in Methods of Purifying Water Electrolytically; and I do hereby declare the following to be a full, clear, and exact description thereof.

This invention relates to a method of purifying liquids by means of an electric current, and especially to the purification of water by passing the same between plates or electrodes connected in an electric circuit.

The object of the invention is to provide a method of treating water in the manner described whereby the water is completely and economically freed from organic and other impurities.

The special objects of the method are to keep the electrodes or plates clean in order to develop their maximum efficiency, and to provide for the complete oxidation of impurities and especially organic matter in the water by the oxygen generated by the electric current.

These objects are accomplished by the process steps hereinafter described and claimed and by suitable apparatus, one embodiment of which is shown in the accompanying drawings in which—

Figure 1:
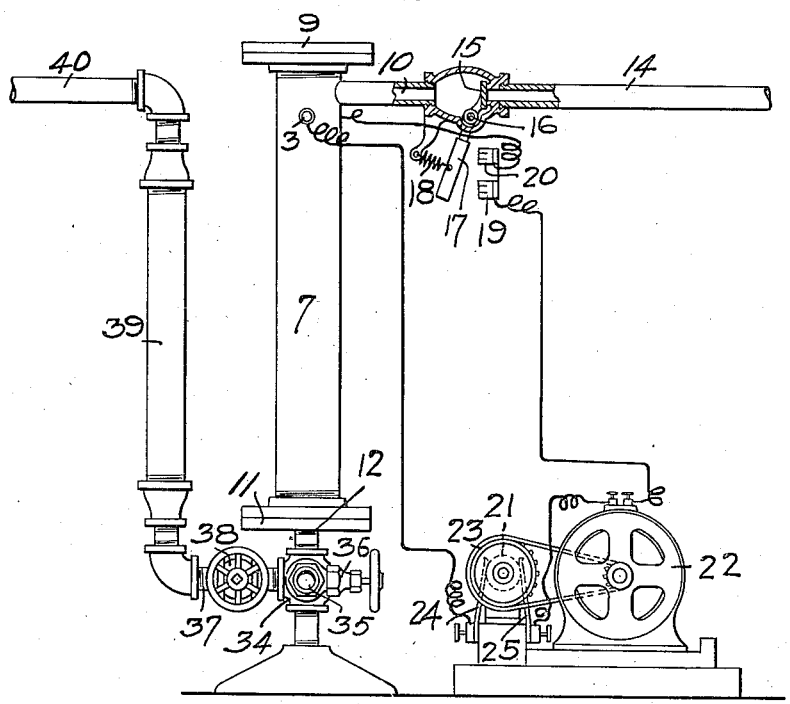
Figure 4:
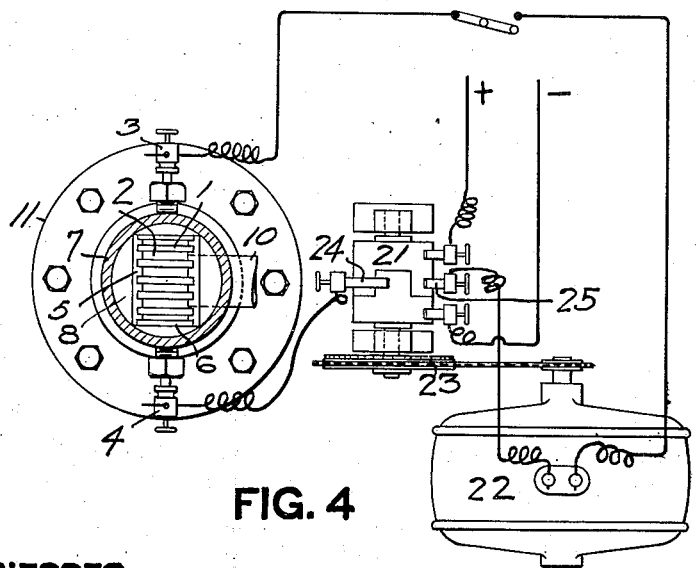
Figure 5:
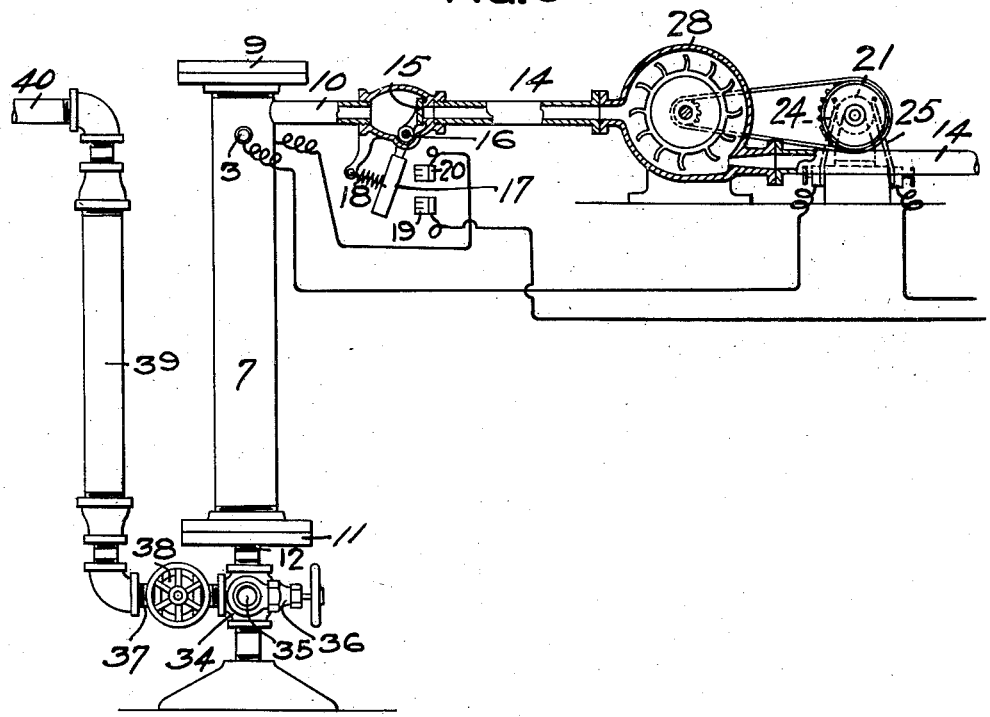
Figure 6:
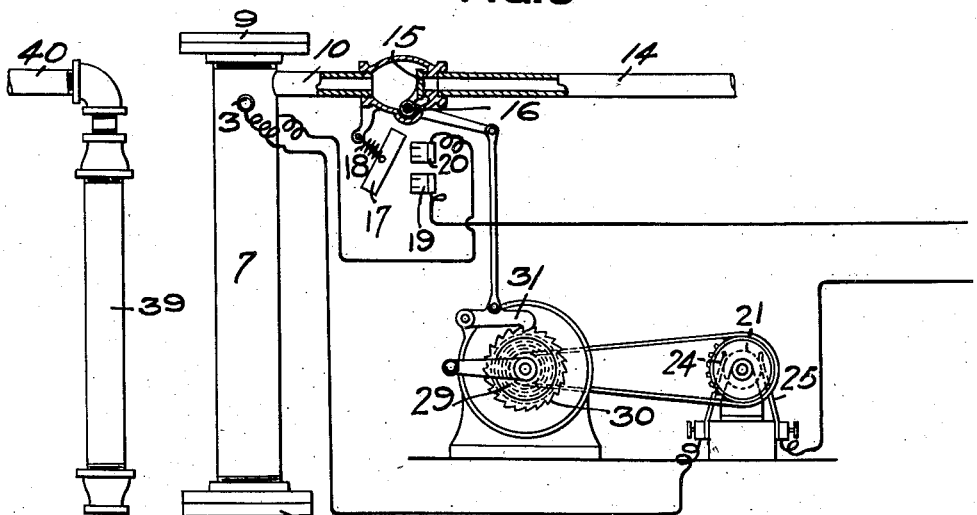

Figure 1 is an elevation, parts being in vertical section, of suitable apparatus for carrying out the method; Fig. 2 is a vertical section on an enlarged scale through one of the units of the apparatus; Fig. 3 is a cross section on the line 3—3, Fig. 2; Fig. 4 is a view partly in cross section and partly in plan showing one means of reversing the current; Fig. 5 is a view partly in elevation and partly in section showing another arrangement for this purpose; and Fig. 6 is a similar view showing still another arrangement for reversing the current.

The principal difficulty in purifying water by an electric current arises from the deposit of the impurities contained in the water on the electrodes or plates due to the electrolytic action of the electric current on the water. This deposit soon creates such resistance to the flow of the electric current that the latter is so materially reduced as not to remove the organic matter from the water.

The primary object of my invention is to keep the plates sufficiently clean as to permit the flow of sufficient current to maintain their efficiency.

A further object is to provide for the full action of the oxygen generated on the organic matter in the water. This is accomplished first, in periodically reversing the current and in a manner to maintain the current in both directions for substantially equal periods of time during the flow of the liquid, thereby passing substantially equal quantities of current in each direction through the impure liquid, thus insuring throwing off from the plate the deposit which may have adhered thereto; second, in providing an electrode box or casing so arranged that the cross sectional area through said casing and between the plates through which the water passes is substantially equal to the inlet and outlet openings, thereby insuring a rapid flow of the water to carry away the deposits or coagulum; and third, providing for the full action of the oxygen generated by the electric current upon the impurities in the water, this being accomplished by inclosing the plates in a sealed chamber and providing in the outlet a suitable chamber in which the rate of flow of the water is reduced to give time for the oxygen to fully oxidize the organic matter contained in the water.

In the accompanying drawings the electrodes are shown at 1, these being comparatively narrow and long aluminum plates arranged vertically so as to provide between the same spaces or passages 2 through which the water, or other liquid, to be purified flows. Five such plates are shown but obviously a greater or lesser number may be used, as desired. The electric circuit is shown connected only to the two side plates of the series, so as to provide intermediate bi-polar plates, but this is not absolutely essential. The electrical connections are made through the binding posts 3 and 4, one connected to each of the outside plates.

The plates are suitably insulated from each other, such as by having their edges fitting in grooves in the edges of plates 5 of suitable insulating material, preferably glass. The remaining two sides of the rectangle are closed by similar insulating plates 6, and the box so formed is inclosed in a suitable casing, such as the pipe 7. The spaces between the glass plates and the pipe are filled with a suitable insulating substance, such as cement 8, thus providing a thorough insulation for the electrodes. The upper end of the pipe 7 is closed by a head 9 with the inlet 10 entering through the pipe 7 below the head 9 and preferably below the upper end of the insulation, as shown. The lower end of the pipe 7 is closed by a head 11 with the outlet opening 12 therethrough. The action of the apparatus is an electrolytic one, the current traversing the water between the plates and precipitating, destroying or coagulating the impurities therein. The electrolytic action causes a deposit to form on the cathode, as is well known, and such deposit reduces the current flow until, if not removed, it eventually reduces the current to such an extent that it practically produces no effect in purifying the water.

According to my method I prevent the formation of any material deposit on the electrode plates, and remove that which has been formed, by periodically reversing the current through the apparatus. This has heretofore been proposed, but in all cases, as far as I am aware, it has been effected by means of a device controlled by the flow of the water through the apparatus and changed each time the flow is stopped or started. As the water is never drawn for the same period two times in succession, there is no regularity as to the time of flow of current in the two directions, and it generally happens that the current flows in one direction a much longer time than in the opposite direction, so that the plates soon become foul. I provide not only for reversing the current periodically, but also for causing it to flow in both directions during equal periods of time, thus insuring the same electrolytic action in both directions and insuring the removal from a plate of the deposit which may have formed on the same during the flow of the electric current in the opposite direction during the preceding period. In this manner the plates are kept practically clean and the current is enabled to effectively purify the water.

The reversal of current and the maintenance of flow for equal periods of time in both directions may be effected by a large variety of apparatus. Preferably also the apparatus is designed to maintain current through the apparatus only when water is being drawn so as to economize current. In the drawings various arrangements of the apparatus are shown for accomplishing the reversal and the automatic make and break of the current.

The supply pipe 14 has connected therein a suitable shutter 15 pivoted at 16 and having connected to the pivot outside of the casing an arm 17 to which is connected a spring 18 arranged to normally hold the shutter across the supply pipe, which position it assumes when no water is being drawn. When, however, the service spigot is opened and water begins to flow through the pipe the pressure thereof, acting against the shutter, throws it open. The arm 17 constitutes a circuit closing device or switch blade arranged to bridge contacts 19 and 20 in the circuit to the electrode plates. Consequently the current is broken when water ceases to flow and is made as soon as water begins to flow, thus insuring economy in electric current.

The reversal of the current may be effected by any suitable reversing mechanism, such as the rotating commutator 21. Such commutators are well known and the one shown needs no description. This commutator may be rotated by various forms of mechanism. Fig. 4 shows an electric motor 22 in the circuit and which is energized whenever the switch 17 is closed. The motor is geared to the commutator by suitable reducing gearing 23. Coöperating with the commutator are the usual brushes 24 and 25 connected in the circuit, so that the rotation of the commutator periodically reverses the current. Since the speed of the motor, and consequently the commutator, is always uniform, the current is maintained in alternate directions for equal periods of time, so that the quantity of current flowing in the two directions is substantially equal.

When the current is flowing in one direction a slight deposit is formed on the cathode plate. When the current is reversed, however, this deposit is loosened up, and, as the current flows in the reverse direction for the same length of time that it did while forming the deposit, said deposit is loosened from the plate. The result is that the plates are always kept clean, as the apparatus is designed to reverse the current sufficiently frequently to prevent the formation of any material deposit. A reversal at intervals of thirty minutes when water is flowing gives satisfactory results, but I do not, of course, limit myself to this interval.

Fig. 5 shows a water motor 28 in the supply pipe, geared up to the commutator 21 for effecting the reversal of the current. Obviously, this motor does not rotate except when the water is flowing through the apparatus. Fig. 6 shows an ordinary spring motor, or clock work, 29 geared up to the commutator for rotating the same. A suitable ratchet wheel 30, connected to the motor, is arranged to be engaged by a detent 31 connected to the flap valve 15, the parts being so arranged that when no water is flowing the detent engages the ratchet wheel and holds the motor inoperative, while, when water begins to flow, the detent is disengaged from the ratchet wheel and permits the motor to operate.

The frequent reversal of the current and maintenance of the same for equal periods of time in alternate directions, throws the deposits off the plate, while the passage of current through the water forms a coagulum or precipitate of the impurities contained therein. In order to wash out the coagulum and deposits, the electrode box is so designed as to maintain a strong flow of water therethrough. This is effected by making the box long and of small cross sectional area, so that the cross sectional area of the water spaces in the box and between the plates is only slightly greater than the cross sectional area of the inlet and flushing outlet openings. Consequently when flushing, the water flowing through the electrode box is subjected to the full head of the supply pipe, maintaining a rapid flow and which washes off the loose deposits from the plates. The plates are made long, as shown, so that the water is acted upon for the required period of time by the electric current notwithstanding its rapid flow.

To the outlet opening 11 is connected a T fitting 34 having a branch 35 for flushing out the apparatus and which is controlled by a valve 36. The service outlet from the fitting 12 has connected thereto a pipe 37 controlled by a valve 38 and leading either to the service spigot, but preferably going to a suitable mixing chamber in which the rate of flow of the water is decreased in order to give the oxygen or ozone, which is formed by the electric current, time to act upon the inorganic matter still held in the water and oxidize the same.

The electrode box, it is observed, is closely sealed and the mixing chamber is likewise sealed so that the oxygen cannot escape but is held in the water to act upon the organic matter still contained therein. This mixing chamber may be any suitable enlarged vessel in which the rate of flow of the water is decreased, and is shown as a pipe 39 of materially larger diameter than the outlet pipe 11 in order to secure the necessary decrease in the rate of flow. Preferably this mixing chamber is arranged vertically with the pipe 37 connected to its lower end and having connected to its upper end a pipe 40 which may lead to the service spigots or may be connected to the upper end of another electrode casing or box, as desired. The electrode box and mixing chamber shown comprises a unit and as many of these units can be assembled in series as necessary, depending upon the quantity of water which is to be purified.

The apparatus shown in this application is not claimed herein, but is claimed in a companion application filed concurrently herewith, Serial No. 418,744. While the method described is primarily intended for the purification of water, as described, it obviously may be used for the purification of liquids of any kind.

What I claim is:

1. The method of purifying liquids, consisting in causing the liquid to flow between metallic electrodes, passing an electric current between said electrodes and through the liquid while flowing, the flow of the liquid and current being synchronously interrupted, periodically reversing said current, and maintaining said circuit in a manner to cause an equal quantity of current to flow between reversals notwithstanding interruption of liquid and current flow.

2. The method of purifying liquids, consisting in causing the liquid to flow between a series of parallel metallic electrodes, connecting an electric circuit to the end plates only of the series and causing the current to flow between the several plates and through the liquid while flowing, the flow of the liquid and current being synchronously interrupted, periodically reversing the current, and maintaining the circuit in a manner to cause an equal quantity of current to flow between reversals notwithstanding interruption of liquid and current flow.

3. The method of purifying liquids, consisting in causing the liquid to flow downwardly between metallic electrodes, passing an electric current between said electrodes and through the liquid while flowing, the flow of the liquid and current being synchronously interrupted, periodically reversing said current, and maintaining the circuit in a manner to cause an equal quantity of current to flow between reversals notwithstanding interruptions of liquid and current flow.

4. The method of purifying liquids, consisting in causing the liquid to flow downwardly between long metallic electrodes contained in a closed chamber, passing an electric current between said electrodes and through said liquid, the flow of liquid and current being synchronously interrupted, periodically reversing said current, and maintaining a rapid flow of the liquid between the electrodes while current is flowing.

5. The method of purifying liquids, consisting in causing the liquid to flow between metallic electrodes having a space therebetween whose cross sectional area is substantially equal to the area of the supply and outlet openings, passing an electric current through said liquid between the electrodes, the flow of liquid and current being synchronously interrupted, periodically reversing said current, and maintaining the circuit in a manner to cause an equal quantity of current to flow between reversals notwithstanding interruptions of liquid and current flow.

6. The method of purifying liquids, consisting in causing the liquid to flow between metallic electrodes contained in a closed chamber, passing an electric current between the electrodes and through the liquid while flowing, synchronously interrupting the flow of liquid and current, periodically reversing said current, and maintaining the circuit in a manner to cause an equal quantity of current to flow between reversals notwithstanding interruptions of liquid and current flow.

7. The method of purifying liquids, consisting in causing the liquid to flow between metallic electrodes and there subjecting the same to the action of an electric current flowing alternately in opposite directions, starting and stopping the flow of electric current with the starting and stopping of flow of liquid, and maintaining the circuit in a manner to cause an equal quantity of current to flow in both directions notwithstanding interruption of liquid and current flow.

8. The method of purifying liquids, consisting in passing the liquid rapidly and under the full supply pressure between electrodes, passing an electric current through the liquid between the electrodes, reversing the current periodically, and then conducting the liquid through a closed chamber and at a diminished rate of flow, whereby the entrained free oxygen is given time to act on the impurities in the liquid.

In testimony whereof, I, the said HARRY B. HARTMAN, have hereunto set my hand.

HARRY B. HARTMAN.

Witnesses:
F. W. WINTER,
ROBERT C. TOTTEN.